United States Patent [19]

Fujiwara et al.

[11] Patent Number: 5,218,544
[45] Date of Patent: Jun. 8, 1993

[54] CONSTANT-SPEED DRIVING CONTROL DEVICE FOR MOTOR VEHICLES

[75] Inventors: Yasuhiro Fujiwara; Kazuyori Katayama, both of Himeji, Japan

[73] Assignee: Mitsubishi Denki K.K., Tokyo, Japan

[21] Appl. No.: 650,848

[22] Filed: Feb. 4, 1991

[30] Foreign Application Priority Data

Feb. 27, 1990 [JP] Japan .................................. 2-47987

[51] Int. Cl.⁵ .............................................. B60K 31/00
[52] U.S. Cl. .................................. 364/426.04; 180/170; 180/179; 123/352
[58] Field of Search .................... 364/426.04; 180/170, 180/176–179; 123/352

[56] References Cited

U.S. PATENT DOCUMENTS

| | | | |
|---|---|---|---|
| 4,394,739 | 7/1983 | Suzuki et al. | 180/179 |
| 4,451,890 | 5/1984 | Suzuki et al. | 180/179 |
| 4,539,642 | 9/1985 | Mizuno et al. | 364/426.04 |
| 4,540,060 | 9/1985 | Kawata et al. | 180/179 |
| 4,890,231 | 12/1989 | Frantz | 364/426.04 |
| 5,025,379 | 6/1991 | Etoh et al. | 364/426.02 |
| 5,054,570 | 10/1991 | Naito et al. | 180/170 |
| 5,085,287 | 2/1992 | Utsumi et al. | 180/179 |

*Primary Examiner*—Gary Chin
*Attorney, Agent, or Firm*—Sughrue, Mion, Zinn, Macpeak & Seas

[57] ABSTRACT

A constant-speed driving control device having an output abnormality detection means in a control unit which detects any output abnormality of command switches from the changed state of the switches.

2 Claims, 4 Drawing Sheets

CONSTANT-SPEED DRIVING CONTROL DEVICE FOR MOTOR VEHICLES

BACKGROUND OF THE INVENTION

1. Field of the Invention

The present invention relates to a constant-speed driving control device for motor vehicles which detects, from the input of a control switch for the constant-speed driving control device, command signals for executing the setting of vehicle speed for constant-speed driving, the change of a vehicle speed, and the cancelling of the set vehicle speed.

2. Discussion of Background

FIG. 3 shows the constitution of a conventional constant-speed driving control device. In this drawing, numeral 1 is an automotive engine; numeral 2 denotes an intake pipe; numeral 3 denotes a throttle valve installed in the intake pipe 2; numerals 4a and 4b express links connected to the throttle valve 3; numeral 5 represents an accelerator pedal; numeral 6 is an actuator; numeral 7 is a control switch which outputs a command signal by external selecting operation; numeral 8 denotes a vehicle-speed sensor; and numeral 9 is a control unit.

Next, the operation of the constant-speed driving control device will be explained. The control unit 9 judges an instruction from the amount of output voltage from the control switch 7, and computes a controlled variable of the actuator 6 on the basis of an output signal from the vehicle-speed sensor 8 during constant-speed driving or other. The actuator 6 that has received a result of this computation operates to open and close the throttle valve 3 through the link 4a. Here, when a driver operates the control switch 7 to output an instruction signal to cancel constant-speed driving, the throttle valve 3 being actuated by the actuator 6 is stopped. The throttle valve 3 is operated to open and close through the link 4b as the driver depresses the accelerator pedal 5.

FIG. 4 shows the circuit constitution of the control switch 7 and the control unit 9, in which numeral 10 denotes a SET/COAST switch (hereinafter referred to as the S/C switch) which is a command switch for setting constant-speed driving during non-constant-speed driving and for carrying out automatic deceleration during constant speed driving, and numeral 11 denotes a RESUME/ACCEL switch (hereinafter referred to as the R/A switch) which is a command switch for automatic resetting to a target speed during non-constant-speed driving when the vehicle speed is stored in a memory unit and for automatic acceleration during constant-speed driving. The S/C switch 10 and the R/A switch 11 are momentary-type command switches which are constantly kept open and selectively operated to open. With these switches 10 and 11 are connected resistors $R_3$ and $R_2$ in series. These sets of serially-connected switches and resistors are connected parallel to each other, with one end being grounded and the other end being connected to an input terminal 18 of the control unit 9 through a terminal area 17. Between the switches 10 and 11 a diode 12 is connected in series. Meanwhile, in the control unit 9, the input terminal 18 is connected with the positive terminal of the comparators 14 to 16 and further connected to a reference power source $V_1$ through a resistor $R_1$. This reference power source $V_1$ is connected to the negative terminal of a comparator 14 through a resistor $R_4$, and further to the negative terminals of the comparators 15 and 16 and to the ground in order through resistors $R_5$ to $R_7$. Also, the output terminals of the comparators 14 to 16 are connected to the ports $P_1$ to $P_3$ of CPU 13.

In the constitution of the constant-speed driving control device shown in FIG. 4, when either of the command switches 10 and 11 is closed, the reference voltage $V_1$ is divided into the resistor $R_1$ and the resistor $R_2$ or $R_3$. The control unit 9 judges a command from the control switch 7 by the amount of the divided voltage. A diode 12 is added to detect the simultaneously closing of the switches 10 and 11 which have been closed by malfunction. Table 1 is a table of operation of the conventional device described above. When the switches 10 and 11 are in the off position, the voltage close to the reference voltage $V_1$ is used as the input voltage $V_{IN}$ of the control unit 9; since this voltage is greater than the comparison voltage $V_{1ref}$ to $V_{3ref}$ of the comparators 14 to 16 which are divided by the resistors $R_4$ to $R_7$, the output of the comparators 14 to 16 becomes H; and therefore an input signal of each of the input ports $P_1$ to $P_3$ of the CPU 13 becomes H. Next, when the R/A switch 11 is turned ON, the input voltage becomes $$\frac{R_2}{R_1 + R_2} V_1, \text{ and accordingly } V_{1ref} > \frac{R_2}{R_1 + R_2} V_1 > V_{2ref},$$

and therefore the input signals at the ports $P_1$ to $P_3$ of the CPU 13 will become L, H and H respectively. Subsequently, when the S/C switch 10 is turned ON, $$V_{IN} = \frac{R_3}{R_1 + R_3} V_1.$$

The value of this voltage becomes a medium value of $V_{2ref}$ and $V_{3ref}$. Accordingly the input signals at $P_1$ to $P_3$ will become L, L, and H respectively. In case the switches 10 and 11 are simultaneously turned on by malfunction, $V_{IN}$ becomes close to 0, and the input signals at $P_1$ to $P_3$ will all become L. The CPU 13 outputs various command Signals in accordance with various input signals, thereby controlling the actuator 6.

TABLE 1

| Control switch mode | Input voltage $V_{IN}$ | CPU input | | |
|---|---|---|---|---|
| | | $P_1$ | $P_2$ | $P_3$ |
| All OFF | $V_1$ | H | H | H |
| R/A switch ON | $\frac{R_2}{R_1 + R_2} V_1$ | L | H | H |
| S/C switch ON | $\frac{R_3}{R_1 + R_3} V_1$ | L | L | H |
| Switches 10 and 11 ON | 0 | L | L | L |

In the conventional constant-speed driving control device described above, however, it is necessary to add the diode 12 to the control switch 7 in order to detect the simultaneous closing of the switches 10 and 11. Also the control unit 9 requires three input comparators and the CPU 13 requires three input ports, which make this device expensive and its construction complicated.

SUMMARY OF THE INVENTION

The present invention has been accomplished in an attempt to solve the problems mentioned above. And its object resides in providing a low-cost constant-speed driving control device of simple construction for motor vehicle.

The foregoing and other objects of the present invention have been attained by providing a constant-speed driving control device comprising a control switch which has a plurality of command switches connected in parallel and outputs an operation command for constant-speed driving by selectively operating each of said command switches to change a divided voltage value of reference voltage; an actuator for opening and closing an engine throttle valve; and a control unit which judges the operation command by the magnitude of an output voltage of said control switch and controls said actuator corresponding thereto, the improvement comprising an output abnormality detection means provided in said control unit for the detection of a changed state of output of each of said command switches which is judged from the output voltage of said control switch.

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
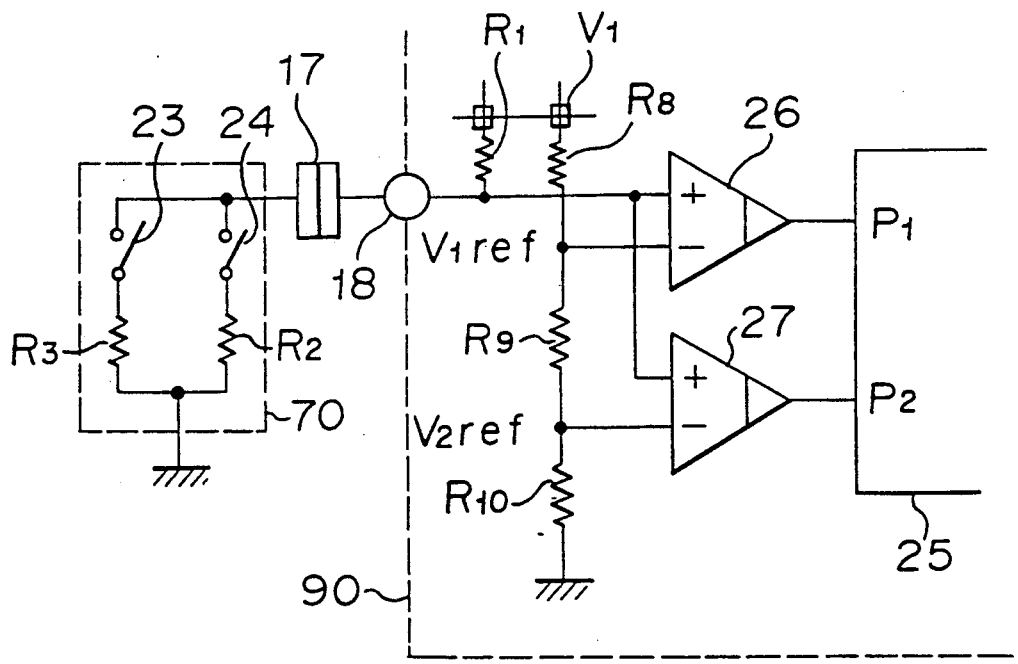
FIG. 1 is a block diagram of circuits of a control switch and a control unit according to the present invention.
Figure 3:
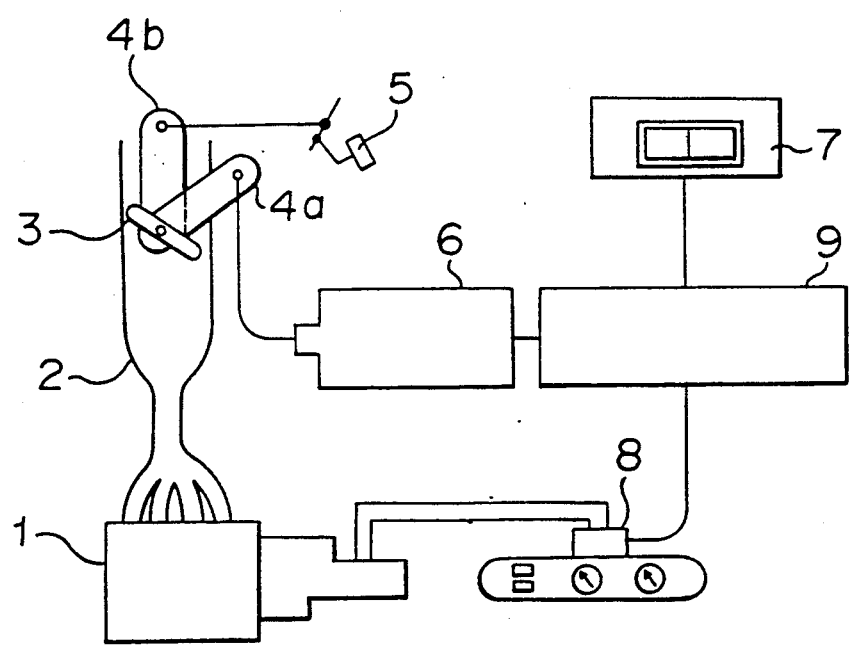
FIG. 3 is a block diagram of a conventional constant-speed driving control device.
Figure 4:
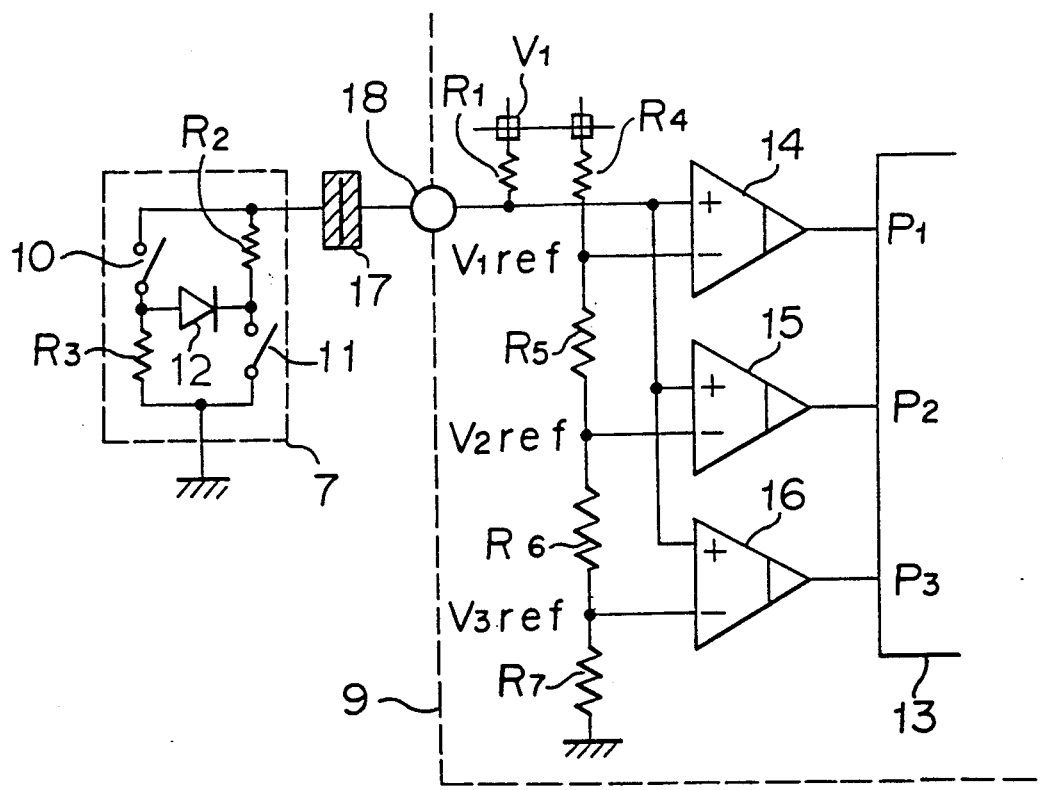
FIG. 4 is a block diagram of circuit of conventional control switch and control unit.

Hereinafter an exemplary embodiment of a constant-speed driving control device according to the present invention will be described with reference to the accompanying drawings. FIG. 1 is a block diagram showing the circuits of a control switch 70 and a control unit 90 of a constant-speed driving control device according to the present embodiment. The constant-speed driving control device is of the same constitution as shown in FIG. 3. In the control switch 70, a S/C switch 23 and a resistor $R_3$ are connected in series, and also a R/A switch 24 and a resistor $R_2$ are connected in series. These two sets of serially connected switches and resistors are connected in parallel, with one end being grounded and the other end being connected to an input terminal 18 of the control unit 90 through a connection area 17. This input terminal 18 is connected to the positive input terminals of comparators 26 and 27 and also connected to the power source $V_1$ through the resistor $R_1$. To this power source $V_1$ is connected the negative terminal of the comparator 26, and further, to a resistor $R_8$ is connected the negative terminal of the comparator 27 through a resistor $R_9$. The resistor $R_9$ is grounded through a resistor $R_{10}$. The output terminals of the comparators 26 and 27 are connected to the input ports $P_1$ and $P_2$ of the CPU 25.

Table 2 is a table of operation of the aforesaid device. First, when the switches 23 and 24 are turned OFF, the input voltage $V_{IN}$ at the input terminal 18 becomes voltage close to $V_1$, and the output of both the comparators 26 and 27 becomes H. Also the output at the ports $P_1$ and $P_2$ becomes H. Subsequently, when the R/A switch 24 is turned to ON, the voltage becomes $$V_{IN} = \frac{R_2}{R_1 + R_2} V_1.$$

Since this voltage is a voltage intermediate between the negative terminal voltages $V_{1ref}$ and $V_{2ref}$ of the comparators 26 and 27, $P_1$ becomes L and $P_2$, H. Next, when the S/C switch 23 is placed in the ON position, the voltage becomes $$V_{IN} = \frac{R_3}{R_1 + R_3} V_1.$$

Because this voltage is less than $V_{2ref}$ both $P_1$ and $P_2$ become L. Furthermore, when both the switches 23 and 24 are set in the ON position, $$V_{IN} = \frac{R_2//R_3}{R_2//R_3 + R_1} V_1.$$

Since this voltage is less then the voltage obtained when the S/C switch 23 is turned to ON, the input signals at both the input ports $P_1$ and $P_2$ become L.

TABLE 2

| Control switch mode | Input voltage $V_{IN}$ | CPU input $P_1$ | $P_2$ |
|---|---|---|---|
| All OFF | $V_1$ | H | H |
| R/A switch ON | $\frac{R_2}{R_1 + R_2} V_1$ | L | H |
| S/C switch ON | $\frac{R_3}{R_1 + R_3} V_1$ | L | L |
| Switches 23 and 24 ON | $\frac{R_2//R_3}{R_2//R_3 + R_1} V_1$ | L | L |

Figure 2:
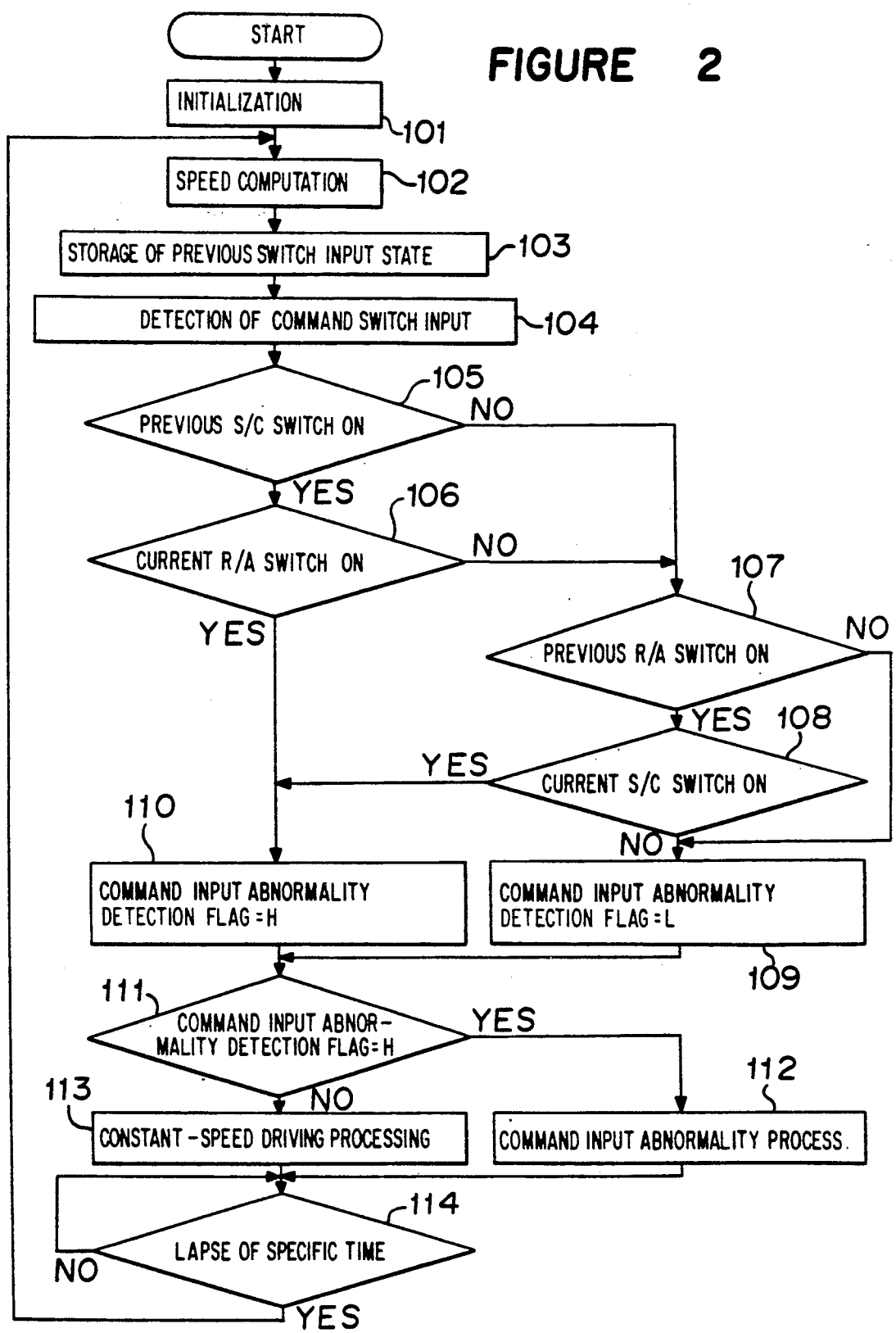
FIG. 2 is a flowchart showing the operation of the control unit according to the present invention.

Next, the operation of the CPU will be explained in detail by referring to the flowchart in FIG. 2. FIG. 2 shows a main routine of operation, which circuits at a fixed cycle. First, at Step 101 information stored in RAM is cleared for initialization. Next, at Step 102 the travelling speed is computed on the basis of a pulse cycle of the vehicle-speed sensor 8. At Step 103 the input state of the command switches 23 and 24 which was previously measured within a specific time is stored. At Step 104 the output signal from the control switch 70 is inputted from the command signal input circuit of the control unit 90, and the input state of the command switches 23 and 24 within a specific time is stored after detection. At Step 105 the previous position of the S/C switch 23 is judged from the input state previously measured. When the S/C switch 23 is in the ON position, the operation proceeds to Step 106 and when in the OFF position, to Step 107. At Step 106 the input state of the R/A switch 24 measured this time is judged. When the R/A switch 24 is closed, the operation proceeds to Step 110 and when open, to Step 107. At Step 107 the previous state of the R/A switch 24 is judged from the input state previously measured. When this switch is ON, the operation proceeds to Step 108, and when OFF, to Step 109. At Step 108 the input state of the S/C switch 23 measured this time is judged. When the switch is ON, the operation proceeds to Step 110, and when OFF, to Step 109. At Step 109, a change from the previous input state to the current input state is recognized as a normal change and after the command input abnormality detection flag is set to L, the operation proceeds to Step 111. At Step 110 the change (S/C→R/A, R/A→S/C) from the previous input state to the current input state is recognized as an abnormal change caused by the simultaneous depression of the command switches 23 and 24, and after the command input abnormality detection flag is set to H, the operation proceeds to Step 111. At Step 111 the command input abnormality detection flag is judged; when the flag is set in H, the operation proceeds to Step 112, and when in L, the operation proceeds to Step 113. At Step 112, after the processing of an input abnormality of the command switches 23 and 24 such as cancel release during constant-speed travelling, the operation proceeds to Step 114. At 113 it is judged that there exists no input abnormality by the command switches and 24, the operation proceeds to the following step of constant-speed driving processing. After the calculation and output of a controlled variable to be fed to the actuator 6, the operation proceeds to Step 114. At Step 114, after the lapse of a specific length of time, the operation returns to Step 102, thus repeating the above-mentioned procedure.

In the above-mentioned embodiment, the cycle of the flow described above is very short as compared with the operation time of the command switches 23 and 24 and accordingly it is possible to monitor the progress of operation of these command switches 23 and 24, thereby enhancing the reliability of the constant-speed driving control device.

Accordingly to the present invention heretofore described, the process of operation of each command switch is monitored to judge abnormality of switch operation when its state of operation changes to other state without passing through a normal state, thereby improving the reliability of abnormality judgment; also since abnormality is not detected by the output from the control switch itself, it is possible to decrease the number of steps of the output voltage of the control switch, thereby enabling the dispensation of the diode in the control switch and a decrease in the number of input ports of the comparators and the CPU in the control unit, thus obtaining inexpensive constant-speed driving control devices of simple construction. Furthermore, it is possible to provide safety and troubleshooting functions by using information stored in a microcomputer.

While the described embodiment represents the preferred form of the present invention, it is to be understood that modifications will occur to those skilled in that art without departing from the spirit of the invention.

What is claimed is:

1. A constant-speed driving control device comprising:
    a control switch including only a first command switch connected in series with a first resistor, and a second command switch connected in series with a second resistor, where said serially connected first command switch and said first resistor are connected in parallel with said serially connected second command switch and said second resistor, said control switch providing for constant-speed driving by selectively operating said first and said second command switches to change a divided voltage value of a reference voltage;
    an actuator for opening and closing an engine throttle valve; and
    a control unit connected to an output of said control switch and provided with an output abnormality detection means including only two comparators which receive the output of said control switch, wherein said output abnormality detection means detects an abnormal condition when both said first and said second command switches are closed, based upon the magnitude of an output voltage of said control switch, and said control unit controls said actuator corresponding thereto.

2. A constant-speed driving control device including a control switch comprising a first command switch connected in series with a first resistor, and a second command switch connected in series with a second resistor, said serially connected first command switch and said first resistor being connected in parallel with said serially connected second command switch and said second resistor, wherein constant-speed driving is provided by selectively operating said first command switch and said second command switch to change a divided voltage value of a reference voltage, said constant-speed driving control device further including an actuator for opening and closing an engine throttle valve, and a control unit connected to an output of said control switch for determining the operation command based upon a change of state of said first and said second command switches, and for controlling said actuator corresponding thereto, said control unit including an output abnormality detection means for detecting an abnormal condition when said first and said second command switches are closed, based upon the magnitude of an output voltage of said control switch, said output abnormality detection means consisting of:
    a first comparator providing a single signal to a first input port of a CPU; and
    a second comparator providing a single signal to a second input pot of said CPU, wherein said output of said control switch is connected to a positive input terminal of said first comparator and said second comparator and further connected to a reference power source through a first resistor, and wherein a negative input terminal of said first comparator is connected to said reference power source through a second resistor and a negative input terminal of said second comparator is connected to said reference power source through said second resistor and a third resistor, said third resistor being grounded through a fourth resistor.

* * * * *